(12) United States Patent
Hieb et al.

(10) Patent No.: US 8,885,549 B2
(45) Date of Patent: Nov. 11, 2014

(54) BANDWIDTH AND BURST RATE ALLOCATION IN VERY SMALL APERTURE TERMINAL (VSAT) NETWORKS

(75) Inventors: Richard D. Hieb, Lake Dallas, TX (US); Robert T. Benanti, Jr., Oxford, NJ (US); John P. Papalski, Bridgewater, NJ (US); Joseph G. Fitzgerald, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 550 days.

(21) Appl. No.: 13/222,737

(22) Filed: Aug. 31, 2011

(65) Prior Publication Data

US 2013/0051311 A1 Feb. 28, 2013

(51) Int. Cl.
*H04J 3/08* (2006.01)
*H04B 7/185* (2006.01)
*H04B 7/212* (2006.01)

(52) U.S. Cl.
CPC .......... *H04B 7/2123* (2013.01); *H04B 7/18578* (2013.01)
USPC ........................................... 370/326; 370/316

(58) Field of Classification Search
CPC ..... H04W 72/04; H04W 72/12; H04W 84/06; H04B 7/185
USPC .................................................. 370/326, 316
See application file for complete search history.

(56) References Cited

U.S. PATENT DOCUMENTS

2003/0035385 A1* 2/2003 Walsh et al. .................. 370/316

* cited by examiner

*Primary Examiner* — Afshawn Towfighi

(57) ABSTRACT

A device receives bandwidth information associated with a very small aperture terminal (VSAT) network. The device calculates burstable and allocated bandwidths for VSAT carriers of the VSAT network to ensure that the VSAT carriers have bandwidth available for traffic that exceeds a minimum target burstable bandwidth. The device also implements the burstable and allocated bandwidths in the VSAT network.

25 Claims, 15 Drawing Sheets

FIG. 5

| Bandwidth Determination | | % Burstable BW Avail | Line Cards in Use | Terminals |
|---|---|---|---|---|
| 512K Group 1 BW Used: | 3,537.13 kb/s | 127% | 5 | 380 |
| 512K Group 1 % BW Utilized: | 89.55% | | | |
| 512K Group 2 BW Used: | 1,551.12 kb/s | 102% | 4 | 2295 |
| 512K Group 2 % BW Utilized: | 54.34% | | | |
| 1024K Group BW Used: | 1,551.12 kb/s | 95% | 5 | 88 |
| 1024K Group % BW Utilized: | 54.34% | | | |
| Out-Route BW: | 17,789.38 kb/s | | Total Cards | Total Terminals |
| Out-Route % Utilized: | 98.83% | | 25 | 2867 |

| VoIP Determination | | |
|---|---|---|
| 512K Group 1 VoIP Calls: | 43 | Call count Ok |
| 512K Group 2 VoIP Calls: | 4 | Call count Ok |
| 1024K Group VoIP Calls: | 11 | Call count Ok |

| | |
|---|---|
| Protocol Processor Threshold: | 400 |
| Processors Required: | 8 |
| Distributed Threshold: | 3300 |
| Non-distributed Threshold: | 800 |
| Total # of Servers: | 3 |

| Carrier Information Rate: | 1024 kb/s | Time Slots/Carrier: | 174 | Total Time Slots: | 870 |
| Carrier IP Throughput: | 790 kb/s | Min. Burstable BW: | 486.4 kb/s | Remotes/Time slot: | 0.4368 |
| Number of Carriers: | 5 | Target Burstable BW: | 512 kb/s | # of Carriers: | 5 |
| FEC Rate: | 0.66 | BW/Time Slot: | 4.54 kb/s | % of Target Available: | 127% |
| Frame Length: | 126.353 | Burstable BW: | 649.026 kb/s | % In-Route BW Used: | 89.55% |

⟵ 610
⟵ 614
⟵ 612

| Site Groups | BW Type | Absolute Out-Route | Absolute In-Route | BW Determiner | In-Route DR | Min CIR | In-Route OS | DR Rates |
|---|---|---|---|---|---|---|---|---|
| Group 1 | DR | kb/s | kb/s | Calculated | 512 | Auto | 50:1 | 100% |
| Group 2 | Standard | kb/s | kb/s | Absolute | 64 | Auto | 50:1 | 25% |

622    624    626    628    630    632    634    636    638

⟵ 620

| Total In-Route BW Available: | 3,950 kb/s |
| Total In-Route BW Used: | 2,537.13 kb/s |
| In-Route BW Left: | 412.87 kb/s |
| Required # of Carriers: | 5 |

| In-Route BW Used: | 2,832.26 kb/s |
| Total Out-Route BW Used: | 3,184.32 kb/s |
| % In-Route BW Used: | 89.55% |
| % In-Route BW Left: | 10.45% |

⟵ 640

| Min CIR Calculations | DR% |
|---|---|
| 0.28 kb/s | 100% |
| 0.28 kb/s | 25% |
| 0.28 kb/s | 10% |

⟵ 650

| FEC Selection Table | |
|---|---|
| Min CIR Table | Partial Time Slot |
| 0.28 | 1 |
| 0.56 | 2 |
| 0.84 | 3 |

| | |
|---|---|
| Total Out-Route BW: | 18 Mb/s |
| Out-Route in kb/s: | 18,000 kb/s |
| 512K Group 1 used: | 3,184.32 kb/s |
| 512K Group 2 used: | 7,052.03 kb/s |
| 1024K Group used: | 1,053.86 kb/s |
| 1544K Group used: | 1,161.57 kb/s |
| 2048K Group used: | 4,825.60 kb/s |
| Out-Route used: | 17,277.38 kb/s |
| Out-Route Overhead BW: | 512 kb/s |
| % of Out-Route used: | 98.83% |
| % of Out-Route left: | 1.17% |

FIG. 11

| Carrier Group | BW Type | Customer ID | Count | Out-Route DR | In-Route DR |
|---|---|---|---|---|---|
| 512K Group 1 | DR | Customer4 | 5 | 64 | 64 |
| 512K Group 1 | Standard | Customer5 | 1 | 1024 | 256 |
| 512K Group 1 | DR | Customer1 | 1 | 512 | 512 |
| 512K Group 1 | Standard | Customer6 | 1 | 256 | 256 |
| 512K Group 1 | Standard | Customer7 | 5 | 512 | 2048 |
| 512K Group 1 | DR | Customer8 | 3 | 1024 | 512 |
| 512K Group 1 | DR | Customer9 | 10 | 384 | 64 |

BANDWIDTH AND BURST RATE ALLOCATION IN VERY SMALL APERTURE TERMINAL (VSAT) NETWORKS

BACKGROUND

A very small aperture terminal (VSAT) is a two-way satellite ground station that accesses satellites in geosynchronous orbit to relay information from small remote earth stations (e.g., terminals) to other terminals in mesh configurations, or to a master earth station (e.g., a hub device) in star configurations. VSAT-based networks are most commonly used to transmit narrowband data (e.g., point of sale transactions) or broadband data for the provision of satellite Internet access, voice over Internet protocol (VoIP), etc. to remote locations.

A private IP satellite network is a VSAT network that utilizes a deterministic time division multiple access (D-TDMA) platform to provide a connection between remote VSATs and a private IP network. The private IP satellite network includes a satellite hub device connected to a large satellite antenna and transmitter that transmits a large out-route carrier. The large out-route carrier is received at the remote VSATs by much smaller antennas. The smaller antennas of the remote VSATs require small-sized in-route carriers so that the remote VSATs can consistently transmit information to the satellite hub device. Since the out-route carrier is a large single carrier, the satellite hub device may manage bandwidth by accounting for bandwidth that is allocated to a group of remote VSATs. The satellite hub device may allocate the bandwidth by utilizing a calculated method that takes into account an oversubscription ratio, an absolute method that reserves an absolute bandwidth on the out-route carrier, or a combination of the two methods.

However, with the use of the D-TDMA platform, current satellite hub devices are unable to manage burstable bandwidths and overall bandwidth pool reservation associated with the in-route carriers. This is due to the fact that the in-route carriers are relatively small in size compared to the out-route carrier (e.g., an out-route carrier may be larger than eighteen (18) megabits per second (Mb/s) while in-route carriers are typically less than two (2) Mb/s), and to the fact that each remote VSAT requires some portion of a time slot to maintain the remote VSAT in the VSAT network.

BRIEF DESCRIPTION OF THE DRAWINGS

FIG. 5 is a diagram of example information capable of being provided in an overview data component of FIG. 4;

FIG. 6 is a diagram of example information capable of being provided in an in-route group data component of FIG. 4;

FIG. 10 is a diagram of example information capable of being provided in an out-route data component of FIG. 4;

FIG. 11 is a diagram of example information capable of being provided in an other data component of FIG. 4.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a mechanism to calculate and/or allocate burst rate and bandwidths in a network, such as a VSAT network. In one example implementation, a hub device of a VSAT network may receive bandwidth information associated with the VSAT network. Based on the bandwidth information, the hub device may calculate burstable and/or allocated bandwidths for VSAT carriers of the VSAT network to ensure that the VSAT carriers have bandwidth available for traffic that exceeds a minimum target burstable bandwidth. The hub device may implement the burstable and/or allocated bandwidths in the VSAT network (e.g., to an out-route carrier and in-route carriers of the VSAT network). The hub device may receive a request for bandwidth from a particular VSAT customer site, and may re-calculate the burstable and/or allocated bandwidths for the VSAT network based on the requested bandwidth. If the requested bandwidth is available, as determined based on the re-calculation, the hub device may allocate the requested bandwidth to the particular VSAT customer site. If the requested bandwidth is not available, as determined based on the re-calculation, the hub device may acquire additional bandwidth for the particular VSAT customer site. For example, an owner or operator of the hub device may install additional components (e.g., line cards) in the hub device to provide the requested bandwidth.

The term "burstable bandwidth," as used herein, is intended to be broadly construed to include bandwidth usage that exceeds a specified threshold for brief periods of time without a financial penalty of purchasing a higher committed information rate (CIR) from a service provider.

The term "customer," as used herein, is intended to be broadly construed to include one or more VSATs or a user of one or more VSATs.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
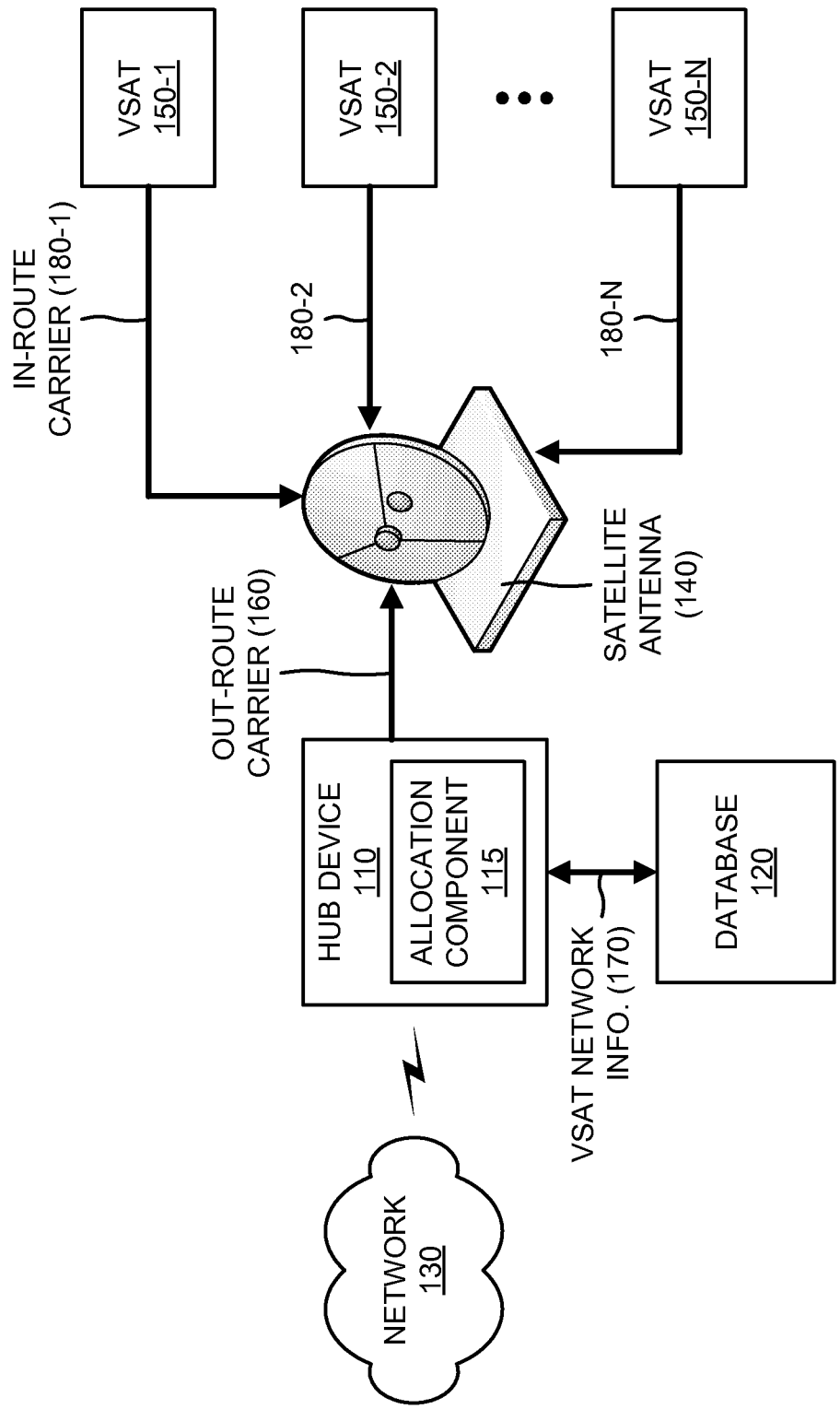
FIG. 1 is a diagram of an example network in which systems and/or methods described herein may be implemented.

FIG. 1 is a diagram of an example VSAT network 100 in which systems and/or methods described herein may be implemented. As illustrated, network 100 may include a hub device 110 (with an allocation component 115), a database 120, a network 130, a satellite antenna 140, and multiple VSATs 150-1, . . . , 150-N (collectively referred to herein as "VSATs 150," and, in some instances, singularly as "VSAT 150"). Components of network 100 may interconnect via wired and/or wireless connections or links. One hub device 110, one allocation component 115, one database 120, one network 130, one satellite antenna 140, and three VSATs 150 have been illustrated in FIG. 1 for simplicity. In practice, there may be more hub devices 110, allocation components 115, databases 120, networks 130, satellite antennas 140, and/or VSATs 150. Also, in some instances, one or more of the components of network 100 may perform one or more functions described as being performed by another one or more of the components of network 100.

Hub device 110 may include one or more computation and/or communication devices that gather, process, search, and/or provide information in a manner described herein. For example, hub device 110 may include one or more server devices that transmit narrowband data or broadband data for the provision of satellite Internet access, network 130 access, VoIP, etc. to remotely located VSATs 150. In one example implementation, hub device 110 may utilize a D-TDMA platform to provide a connection or gateway between remote VSATs 150 and a private IP network, such as network 130. Hub device 110 may connect to satellite antenna 140 and may provide an out-route carrier signal 160 (referred to herein as out-route carrier 160), via satellite antenna 140, that is received at remote VSATs 150. Out-route carrier 160 may include narrowband or broadband traffic (e.g., data) for the provision of satellite Internet access, network 130 access, VoIP, etc. to VSATs 150.

As further shown in FIG. 1, hub device 110 may include an allocation component 115 that may determine bandwidth and burst rate allocation for VSATs 150. In one example implementation, allocation component 115 may receive bandwidth information associated with VSAT network 100, such as bandwidth used by VSATs 150, bandwidth allocated to VSATs, etc. Based on the bandwidth information, allocation component 115 may calculate burstable and/or allocated bandwidths for VSATs 150 to ensure that VSATs 150 have bandwidth available for traffic that exceeds a minimum target burstable bandwidth. Allocation component 115 may implement the burstable and/or allocated bandwidths in VSAT network 100, and may receive a request for bandwidth from a particular VSAT customer (e.g., from a customer that operates one or more VSATs 150). Based on the requested bandwidth, allocation component 115 may re-calculate the burstable and/or allocated bandwidths for VSAT network 100. If the re-calculation indicates that the requested bandwidth is available, allocation component 115 may allocate the requested bandwidth to the particular VSAT customer. If the re-calculation indicates that the requested bandwidth is unavailable, allocation component 115 may indicate a need for additional bandwidth for the particular VSAT customer. In order to provide the additional bandwidth, hub device 110 may be provided with hardware that provides the additional bandwidth, another hub device 110 may added to VSAT network 100, etc.

Database 120 may include one or more storage devices that store information provided by and/or retrieved by hub device 110. In one example implementation, database 120 may store VSAT network information 170. VSAT network information 170 may include any information associated with VSAT network 100. For example, VSAT network information 170 may include bandwidth utilized by VSATs 150, bandwidth allocated to VSATs 150, out-route carrier 160 bandwidth, in-route carrier bandwidth, burstable bandwidth allocated to VSATs 150, a number of VSATs 150, a forward error correction (FEC) rate, etc.

Network 130 may include a local area network (LAN), a wide area network (WAN), a metropolitan area network (MAN), a telephone network, such as the Public Switched Telephone Network (PSTN), an intranet, the Internet, an optical fiber or fiber optic-based network, or a combination of networks. In one example implementation, network 130 may include a private IP network that provides narrowband data or broadband data for the provision of satellite Internet access, VoIP, etc. to VSATs 150.

Satellite antenna 140 may provide an interface for network 130 and VSATs 150. In one example implementation, satellite antenna 140 may receive out-route carrier 160 from hub device 110, and may provide out-route carrier 160 to VSATs 150 (not shown in FIG. 1). Alternatively, or additionally, satellite antenna 140 may receive in-route carrier signals 180-1, . . . , 180-N (collectively referred to herein as "in-route carriers 180," and, in some instances, singularly as "in-route carrier 180") from VSATs 150, and may provide in-route carriers 180 to hub device 110 (not shown in FIG. 1). In-route carriers 180 may include traffic generated by VSATs 150 and destined for network 130.

VSAT 150 (also referred to herein as "terminal" or "remote") may include a two-way satellite ground station or terminal that accesses satellite antenna 140 to relay traffic to/from other VSATs 150 and/or hub device 110. VSAT 150 may include an antenna that transmits in-route carrier 180 so that VSAT 150 can consistently transmit traffic to hub device 110. VSAT 150 may also include a satellite modem that may be controlled by hub device 110. As shown in FIG. 1, VSATs 150 may provide in-route carriers 180 to satellite antenna 140, and satellite antenna 140 may provide in-route carriers 180 to hub device 110.

Although FIG. 1 shows example components of network 100, in other implementations, network 100 may contain fewer components, different components, differently arranged components, or additional components than depicted in FIG. 1.

Figure 2:
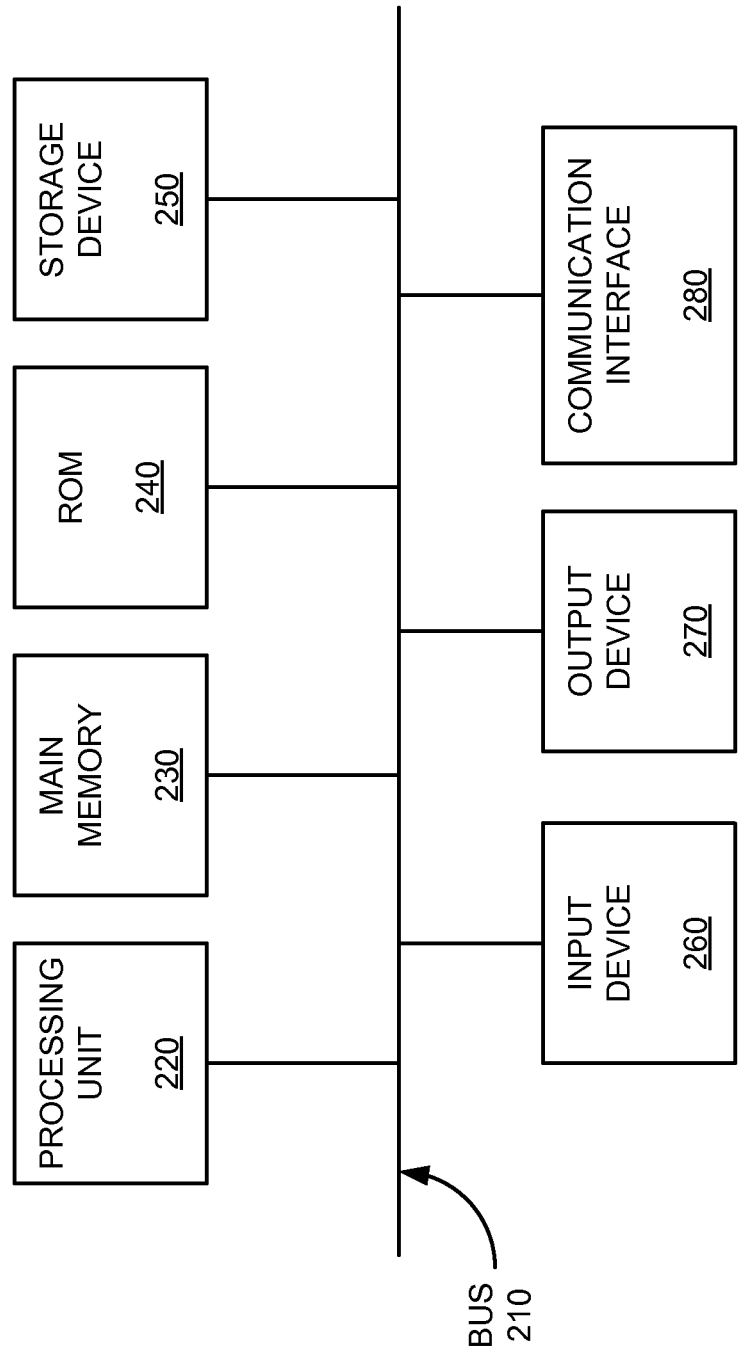
FIG. 2 is a diagram of example components of one or more devices of the network illustrated in FIG. 1.

FIG. 2 is a diagram of example components of a device 200 that may correspond to one or more devices of network 100, such as hub device 110. In one example implementation, devices of network 100 may include one or more devices 200 and/or one or more components of device 200. As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
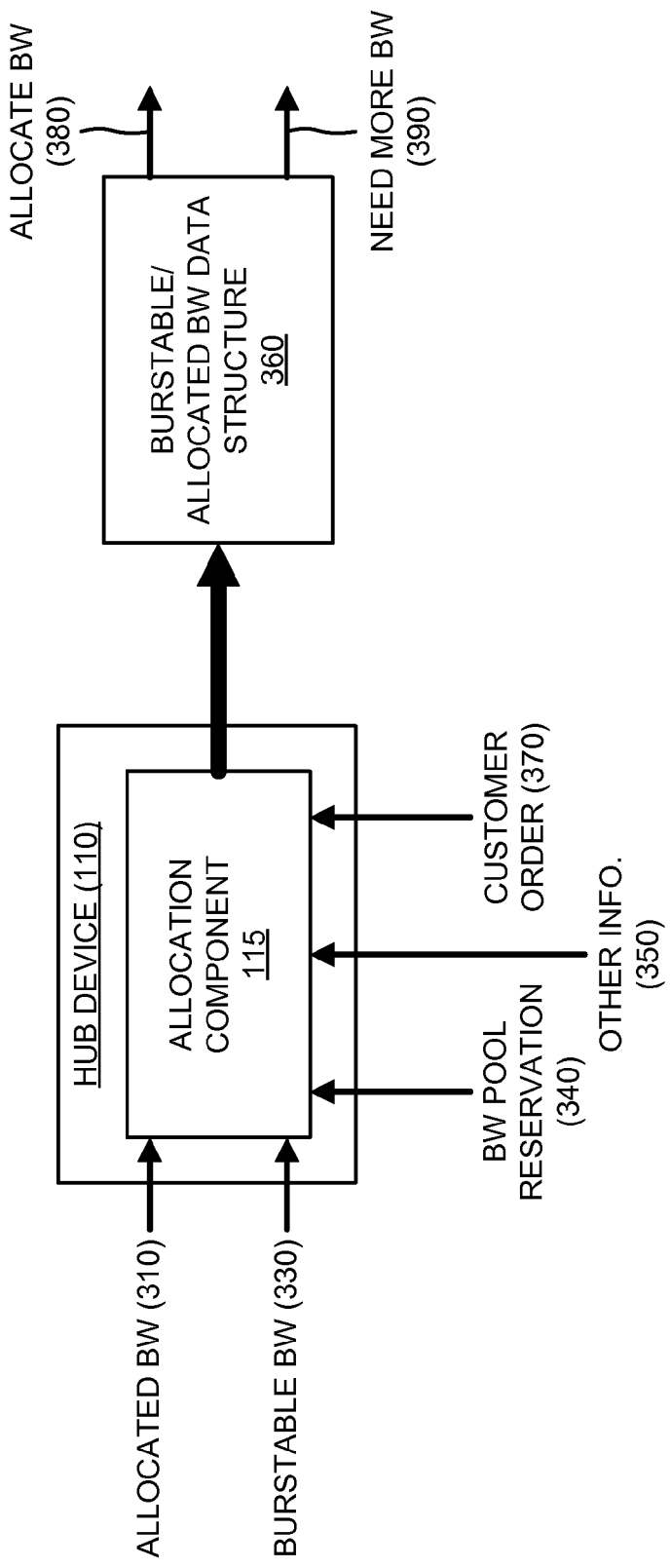
FIG. 3 is a diagram of example operations capable of being performed by an example portion of the network illustrated in FIG. 1.

FIG. 3 is a diagram of example operations capable of being performed by an example portion 300 of network 100 (FIG. 1). As shown in FIG. 3, network portion 300 may include hub device 110. Hub device 110 may include the features described above in connection with, for example, one or more of FIGS. 1 and 2.

As further shown in FIG. 3, allocation component 115 of hub device 110 may receive allocated bandwidth (BW) information 310, burstable bandwidth information 330, bandwidth reservation pool information 340, and other information 350. In one example implementation, information 310-350 may correspond to VSAT network information 170 (FIG. 1).

Allocated bandwidth information 310 may include an amount of bandwidth that is assigned to actual or planned VSATs 150 in VSAT network 100. Burstable bandwidth information 330 may include a maximum bandwidth that is available to be granted to a VSAT 150 for a short period of time. A burst may include a single instance of transmitting traffic from a single VSAT 150 on an in-route carrier 180. Dependant on a frame length, several bursts may equal a time slot. A frame length may include a time period that defines how often a time plan is calculated (e.g., a 125 millisecond (ms) frame length may indicate that a time plan is calculated every 125 ms). A time slot may include a period of time that a VSAT 150 is assigned to transmit on an in-route carrier 180. A time slot may equate to a specific amount of traffic based on a carrier size, FEC rate, frame length, etc. A time plan may include a plan that contains assignment of VSATs 150 to time slots on in-route carriers 180. Burstable bandwidth information 330 may include a target burstable bandwidth and a minimum burstable bandwidth. A target burstable bandwidth may include a desired burstable bandwidth rate to be maintained in an in-route carrier 180 or an in-route carrier group. A minimum burstable bandwidth may include a minimum acceptable burstable bandwidth maintained by an in-route carrier 180 or an in-route carrier group.

Bandwidth pool reservation information 340 may include an available bandwidth pool that is assigned to VSATs 150. Other information 350 may include other information associated with operation of VSAT network 100, such as: a time slot per carrier; IP throughput per carrier; a number of carriers; a bandwidth per time slot; a bandwidth used for managing VSATs 150; a number VSATs 150; a bandwidth type; a number of bursts per time slot; a burstable data rate; an oversubscription value; disaster recovery rates; etc.

In one example implementation, based on information 310-350, allocation component 115 may calculate burstable and/or allocated bandwidths for VSATs 150 to ensure that VSATs 150 have bandwidth available for traffic that exceeds a minimum target burstable bandwidth. As shown in FIG. 3, allocation component 115 may calculate burstable and/or allocated bandwidths for VSATs 150 via a burstable/allocated bandwidth data structure 360. Burstable/allocated bandwidth data structure 360 may include, for example, one or more tables, one or more databases, one or more spreadsheets, one or more trees, or some other arrangement for storing and organizing information associated with VSAT network 100.

As further shown in FIG. 3, allocation component 115 may receive a customer order 370 that includes a request for bandwidth from a particular VSAT customer (e.g., from a customer that operates one or more VSATs 150). Based on the requested bandwidth of customer order 370, allocation component 115 may re-calculate the burstable and/or allocated bandwidths for VSAT network 100. For example, allocation component 115 may re-calculate burstable/allocated bandwidth data structure 360 based on customer order 370. If the re-calculation indicates that the requested bandwidth is available in VSAT network 100, allocation component 115 may allocate the requested bandwidth to the particular VSAT customer, as indicated by reference number 380. If the re-calculation indicates that the requested bandwidth is unavailable, allocation component 115 may indicate a need for additional bandwidth for the particular VSAT customer, as indicated by reference number 390. In order to provide the additional bandwidth, hub device 110 may be provided with hardware that provides the additional bandwidth, another hub device 110 may added to VSAT network 100, etc.

Although FIG. 3 shows example components of network portion 300, in other implementations, network portion 300 may include fewer components, different components, differently arranged components, or additional components than depicted in FIG. 3. Alternatively, or additionally, one or more components of network portion 300 may perform one or more other tasks described as being performed by one or more other components of network portion 300.

Figure 4:
FIG. 4 is a diagram of example components of a burst/allocation bandwidth data structure of FIG. 3.

FIG. 4 is a diagram of example components of burst/allocation bandwidth data structure 360 (FIG. 3). As shown in FIG. 4, burst/allocation bandwidth data structure 360 may include an overview data component 400, multiple in-route group data components 410-1, . . . , 410-M (collectively referred to herein as "in-route group data components 410," and, in some instances, singularly as "in-route group data component 410"), an out-route data component 420, and an other data component 430.

Although FIG. 4 shows example components of burst/allocation bandwidth data structure 360, in other implementations, burst/allocation bandwidth data structure 360 may include fewer components, different components, differently arranged components, or additional components than depicted in FIG. 4. Alternatively, or additionally, one or more components of burst/allocation bandwidth data structure 360 may perform one or more other tasks described as being performed by one or more other components of burst/allocation bandwidth data structure 360.

Overview data component 400 may include information providing a summary view of operation of VSAT network 100. FIG. 5 is a diagram of example information 500 capable of being provided in overview data component 400. As shown in FIG. 5, overview data component 400 may include a section 510 that provides a bandwidth determination, a percent (%) of burstable bandwidth available, a quantity of line cards in use (e.g., in hub device 110), and a quantity of terminals (e.g., VSATs 150) in VSAT network 100. The bandwidth determination may provide a bandwidth used 512 and a percent of bandwidth utilized 514 by groups of VSATs 150 of network 100. For example, a first group of VSATs 150 may use 3,537.13 kb/s of bandwidth, which may account for 89.55% of the bandwidth available to the first group of VSATs 150. The percent of burstable bandwidth available may provide a percentage 516 of burstable bandwidth available for the groups of VSATs 150. For example, the first group of VSATs 150 may have 127% of burstable bandwidth available. The quantity of line cards in use may provide a quantity of line cards in hub device 110 that are used for the groups of VSATs 150. For example, the first group of VSATs 150 may utilize five (5) line cards of hub device 110. The quantity of terminals may provide a quantity of VSATs 150 that are in each group of VSATs 150. For example, the first group of VSATs 150 may include three-hundred and eighty (380) terminals. Section 510 may also provide information associated with a bandwidth of out-route carrier 160 (e.g., 17,789.38 kb/s), and a percent (%) of bandwidth utilized of out-route carrier 160 (e.g., 98.83%).

As further shown in FIG. 5, overview data component 400 may include a section 520 that provides a quantity of VoIP calls being generated by the groups of VSATs 150. For example, the first group of VSATs 150 may be generating forty three (43) VoIP calls. Overview data component 400 may include a section 530 that provides information associated with hardware of hub device 110 needed to support VSATs 150. For example, section 530 may indicate that hub device 110 has a particular protocol processor threshold, a quantity of required processors, a total number of servers, etc. for supporting VSATs 150.

Overview data component 400 may indicate that a percent of burstable bandwidth available for a group of VSATs 150 is greater than 100% since VSAT network 100 may be designed to permit in-route carriers 180 to burst to rates much higher than a target burstable rate for a group of VSATs 150. This may be done because when VSATs 150 are added to an in-route group, a small amount of burstable bandwidth may be used for maintenance of VSATs 150 of network 100. Thus, allocation component 115 may monitor a burstable bandwidth designed for VSAT network 100 to ensure that the burstable bandwidth remains close to the target burstable bandwidth. When VSATs 150 or groups of VSATs 150 are added to an in-route group, a bandwidth pool allocation may increase and the total burstable bandwidth may decrease. An optimal situation may occur when the bandwidth pool allocation rises to 100% and the total burstable bandwidth decreases to 100% since this may indicate that all of the bandwidth pool is allocated and the target burstable bandwidth is being maintained.

Although FIG. 5 shows example information 500 of overview data component 400, in other implementations, overview data component 400 may include less information, different information, differently arranged information, or more information than depicted in FIG. 5.

Returning to FIG. 4, in-route group data components 410 may provide information for different in-route groups in VSAT network 100, and may perform calculations that aggregate to overview data component 400. FIG. 6 is a diagram of example information 600 capable of being provided in one of in-route group data components 410. As shown in FIG. 6, in-route group data component 410 may include a section 610 that defines parameters of an in-route group. For example, section 610 may include a carrier information rate, a carrier IP throughput, a number of carriers, a FEC rate, a frame length, a time slot per carrier, a minimum burstable bandwidth, a target burstable bandwidth, a bandwidth per time slot, a burstable bandwidth, total time slots, remotes (VSATs) per time slot, a percent of target bandwidth available, and a percent of in-route bandwidth used.

In one example, the number of carriers, the carrier IP throughput, and the time slot per carrier may be used to determine a total bandwidth and a burstable bandwidth that are available to be allocated in a group of VSATs 150. For example, the total available bandwidth may be determined by multiplying the number of carriers and the carrier IP throughput. As VSATs 150 are added to a group, in-route group data component 410 may compare a total bandwidth allocated to the added VSATs 150 with a total available bandwidth in order to determine an allocated bandwidth percentage 612.

The available burstable bandwidth may be determined based on the bandwidth per time slot, the total time slots, and time slots used maintain network management for VSATs 150. In-route group data component 410 may determine a total burstable bandwidth per carrier by totaling a management bandwidth of a group of VSATs 150 and subtracting the management bandwidth from the available time slots per carrier. The total burstable bandwidth per carrier may be displayed in the burstable bandwidth field of section 610, and may be compared to the target burstable bandwidth field to determine percent of a target burstable bandwidth available 614. Allocated bandwidth percentage 612 and percent of target burstable bandwidth available 614 may be aggregated to overview data component 400, in fields 514 and 516, respectively (FIG. 5). In addition to the in-route calculations, an amount of out-route bandwidth for each group of VSATs 150 may be totaled and aggregated in out-route data component 420.

Figure 7:
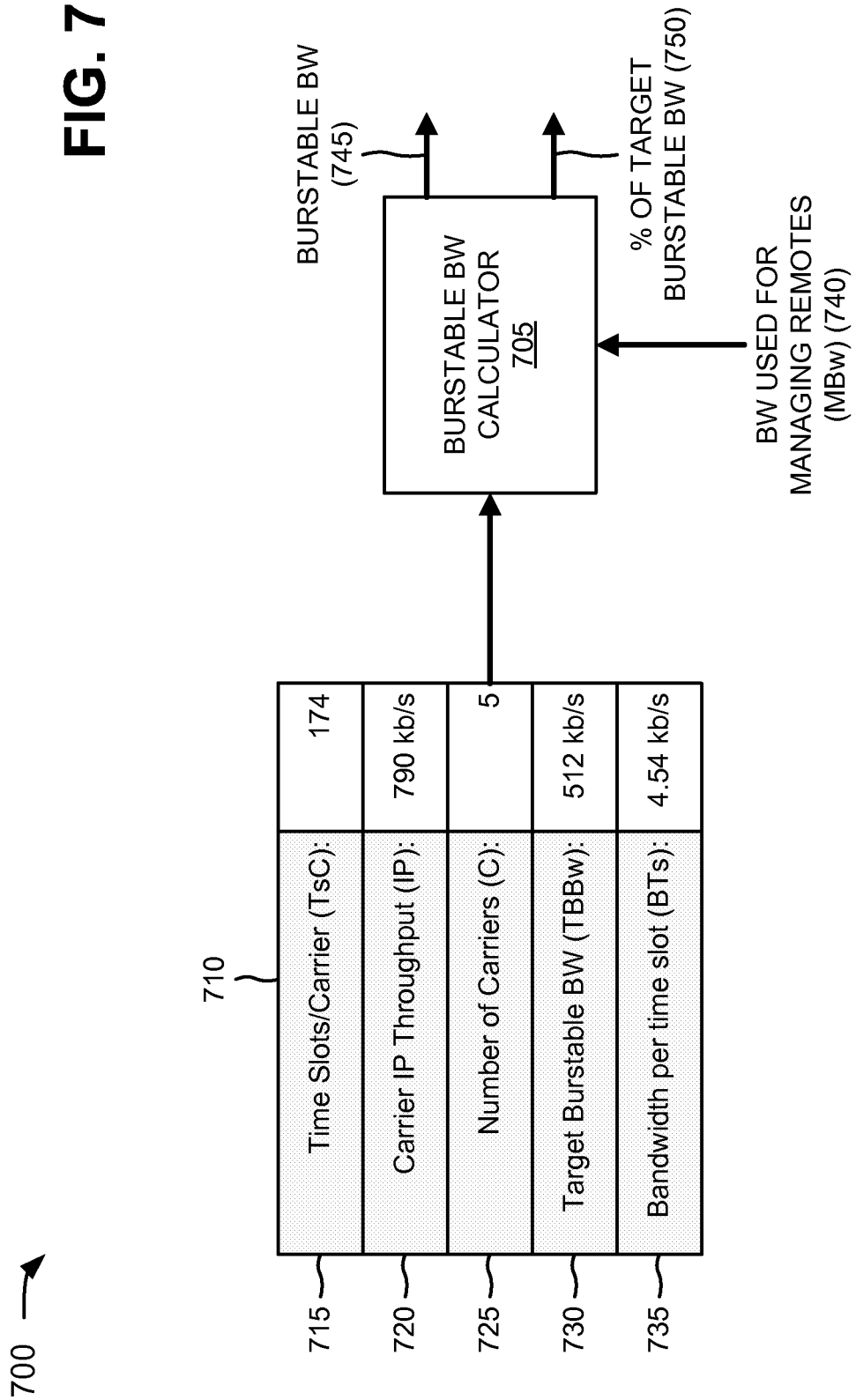
FIG. 7 is a diagram of example operations capable of being performed by a functional component of the hub device.

The available burstable bandwidth and the percent of target burstable bandwidth available may be calculated as set forth in FIG. 7. FIG. 7 is a diagram of example operations 700 capable of being performed by a functional component of hub device 110. In one example, the operations described in connection with FIG. 7 may be performed by one or more components of device 200 (FIG. 2).

As shown, hub device 110 may include a burstable bandwidth calculator 705 that receives information 710 from in-route group data component 410 (e.g., from information contained in FIG. 6). For example, information 710 may include a time slots per carrier (TsC) field 715, a carrier IP throughput (IP) field 720, a number of carriers (C) field 725, a target burstable bandwidth (TBBw) field 730, and a bandwidth per time slot (BTs) field 735, which equals the carrier IP throughput divided by the time slots per carrier (IP/TsC). Burstable bandwidth calculator 705 may also receive a bandwidth used for managing remotes (MBw) 740. Burstable bandwidth calculator 705 may calculate an available burstable bandwidth 745 and a percent of target burstable bandwidth 750 based on information 710 and bandwidth used for managing remotes (MBw) 740.

In one example implementation, burstable bandwidth calculator 705 may calculate available burstable bandwidth 745 and percent of target burstable bandwidth 750 according to the following equations:

$$\text{Burstable Bandwidth} = (((TsC * C) * BTs) - ((MBw * BTs))) / C \quad (1),$$

$$\text{\% of Target Burstable Bandwidth} = \text{Burstable Bandwidth} / TBBw \quad (2).$$

Utilizing the values provided in FIG. 7 and assuming that MBw=156 kb/s and BTs=IP/TsC=790/174=4.54 kb/s, burstable bandwidth calculator 705 may calculate available burstable bandwidth 745 and percent of target burstable bandwidth 750 as follows:

Burstable Bandwidth=(((174*5)*4.54)−((156*4.54))/5=648.345 kb/s,

% of Target Burstable Bandwidth=648.345/512=127%.

The above example assumed that VSATs 150 were in VSAT network 100. However, if there were no VSATs 150 in VSAT network 100, available burstable bandwidth 745 would be calculated as (((174*5)*4.54)−(0*4.54))/5=789.96 kb/s.

Although FIG. 7 shows an example functional component of hub device 110, in other implementations, hub device 110 may include different functional components, differently arranged functional components, or additional functional components than depicted in FIG. 7.

Returning to FIG. 6, in-route group data component 410 may include a section 620 that defines additional parameters of an in-route group. Section 620 may include a site groups field 622 that identifies an in-route group; a bandwidth type field 624 that defines a bandwidth type for site groups field 622; an absolute out-route field 626 that includes a user-entered total bandwidth allocated for out-route carrier 160; an absolute in-route field 628 that includes a user-entered total bandwidth allocated for an in-route group; a bandwidth determiner field 630 that defines a method of calculating bandwidth for a group of VSATs 150; an in-route data rate (DR) field 632 that includes an amount of burstable bandwidth assigned to an in-route group; a minimum committed information rate (CIR) field 634 that includes a minimum amount of bandwidth that can be assigned to a single VSAT 150; an in-route oversubscription (OS) field 636 that includes an oversubscription ratio used in calculating bandwidth allocated to a pool of VSATs 150 in an in-route direction; and a disaster recovery (DR) rates field 638 that includes a percentage of a group of disaster recovery VSATs 150 that are expected to utilize hub device 110.

In-route group data component 410 may include a section 640 that defines further parameters of an in-route group. Section 640 may include a total in-route bandwidth available for a group of VSATs 150; a total in-route bandwidth used by the group of VSATs 150; in-route bandwidth left for the group of VSATs 150; a required number of carriers for the group of VSATs 150; a total out-route bandwidth used by the group of VSATs 150; a percentage of in-route bandwidth used by the group of VSATs 150; and a percentage of in-route bandwidth left for the group of VSATs 150.

As further shown in FIG. 6, in-route group data component 410 may include a minimum CIR table 650 and a FEC selection table 660. Minimum CIR table 650 may include a minimum CIR calculations field that provides a minimum amount of bandwidth that may be assigned to an individual VSAT 150. Minimum CIR table 650 may also include a disaster recovery (DR) percentage field that includes a percentage of a group of disaster recovery VSATs 150 that are expected to utilize hub device 110. FEC selection table 660 may include values from minimum CIR table 650 and a partial time slot field that provides time slots for the values from minimum CIR table 650.

Although FIG. 6 shows example information 600 of in-route group data component 410, in other implementations, in-route group data component 410 may include less information, different information, differently arranged information, or more information than depicted in FIG. 6.

In equations (1) and (2) above, the management bandwidth may be set to an absolute value. However, in order to determine the burstable bandwidth, actual calculations for the management bandwidth may be performed to determine an actual bandwidth reservation for groups of VSATs 150 in an in-route group. To determine the management bandwidth, a FEC rate may be selected, and FEC selection table 660 may be populated with minimum CIR step sizes available based on the selected FEC rate. A type of bandwidth assigned to a group of VSATs 150 may then be determined. The type of bandwidth assigned to VSATs 150 may be either standard or disaster recovery (DR). If the bandwidth type is standard, VSATs 150 may be more active in the use of network 100 and may be provided more minimum CIR to improve performance in network 100. If the bandwidth type is DR, VSATs 150 may use an alternate path to network 130 and may be provided less minimum CIR to minimize overhead impact to VSATs 150 in network 100. An amount of management traffic (or time slots) reserved for a group of VSATs 150 may be greater for standard bandwidth than for DR bandwidth. Minimum CIR field 634 may be another variable used to determine the management bandwidth. If minimum CIR field 634 is set to automatic (Auto), then the amount of management traffic (or time slots) may be calculated. If minimum CIR field 634 includes a specific value, then the amount of management traffic (or time slots) may be the specific value.

Figure 8:
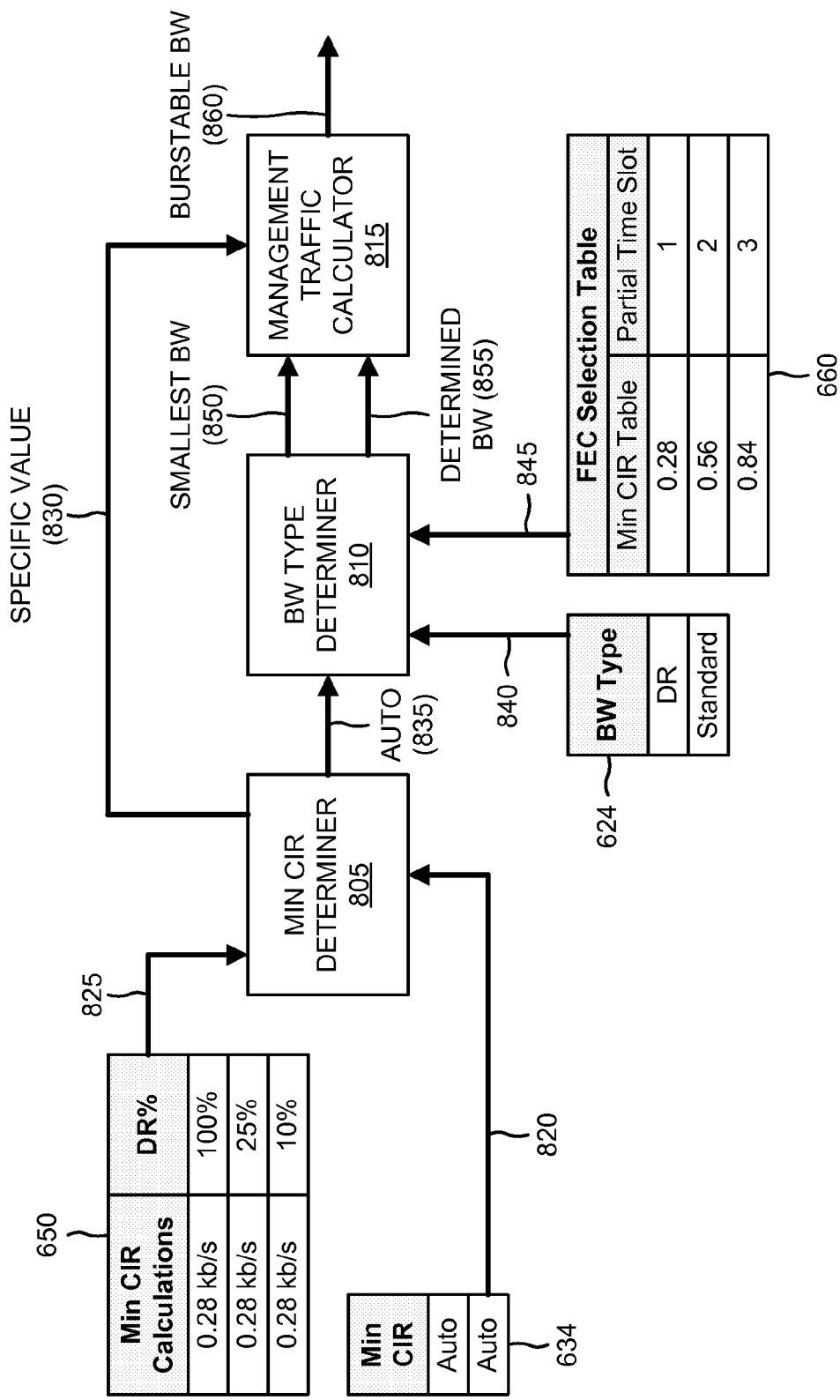
FIG. 8 is a diagram of example operations capable of being performed by additional functional components of the hub device.

The management bandwidth and the burstable bandwidth may be calculated as set forth in FIG. 8. FIG. 8 is a diagram of example operations 800 capable of being performed by additional functional components of hub device 110. In one example, the operations described in connection with FIG. 8 may be performed by one or more components of device 200 (FIG. 2). As shown, hub device 110 may include a minimum CIR determiner 805, a bandwidth type determiner 810, and a management traffic calculator 815.

Minimum CIR determiner 805 may receive information 820 from minimum CIR field 634 and information 825 from minimum CIR table 650. Minimum CIR determiner 805 may determine, based on information 820 and/or information 825, whether minimum CIR field 634 is set for automatic or specific value 830. If minimum CIR field 634 is set for specific value 830, minimum CIR determiner 805 may provide specific value 830 to management traffic calculator 815 and specific value 830 may be used for each VSAT's management bandwidth. If minimum CIR field 634 is set for automatic, minimum CIR determiner 805 may provide, to bandwidth type determiner 810, an indication 835 that minimum CIR field 634 is set for automatic.

Bandwidth type determiner 810 may receive indication 835, and may retrieve, based on indication 835, information 840 from bandwidth type field 624 and information 845 from FEC selection table 660. Bandwidth type determiner 810 may determine, based on information 840, whether bandwidth type field 624 is set to a bandwidth type of DR or standard. If bandwidth type field 624 is set to a bandwidth type of DR, bandwidth type determiner 810 may use the smallest bandwidth 850 for the management bandwidth based on a FEC rate selection for each VSAT 150 (e.g., as provided in information 845). If bandwidth type field 624 is set to a bandwidth type of standard, bandwidth type determiner 810 may use a determined bandwidth 855 for the management bandwidth based on the FEC rate selection.

Management traffic calculator 815 may receive, as the management bandwidth, specific value 830 from minimum CIR determiner 805. Alternatively, management traffic calculator 815 may receive, as the management bandwidth, smallest bandwidth 850 or determined bandwidth 855 from bandwidth type determiner 810. Based on the received management bandwidth, management traffic calculator 815 may calculate management traffic for a group of VSATs 150 in time slots. Management traffic calculator 815 may accomplish this by comparing the management bandwidth (MB) to a look up table and retrieving a number of bursts from the table. Management traffic calculator 815 may multiply the number of bursts by a number (N) of VSATs 150 in a group and may divide the result by a number (Bursts) of bursts per time slot, as set forth in the following equation:

$$(MB*N)/\text{Bursts} \quad (3).$$

For example, if a number (N) of VSATs=4, the management bandwidth (MB)=1 for DR type bandwidth and 8 for standard type bandwidth (e.g., based on the look up table), and a number (Bursts) of bursts per time slot=16, management traffic calculator 815 may calculate a (1*4)/16=0.25 time slot for DR type bandwidth and a (8*4)/16=2.0 time slot for standard type bandwidth.

To calculate the management bandwidth impact of all VSATs 150 in an in-route group, management traffic calculator 815 may add the time slots used by all groups and multiply by a bandwidth per time slot number. For example, using the example provided above, management traffic calculator 815 may determine that 0.25+2=2.25 time slots may be used to manage eight (8) VSATs. This may provide 2.25*4.54=10.2 kb/s of management traffic.

Management traffic calculator 815 may utilize these calculations in equation (1) to determine a burstable bandwidth 860 per carrier, and may calculate (((174*5)*4.54)−(2.25*4.54))/5=787.917 kb/s of burstable bandwidth per carrier. Management traffic calculator 815 may output burstable bandwidth 860 to in-route group data component 410.

Although FIG. 8 shows example functional components of hub device 110, in other implementations, hub device 110 may include fewer functional components, different functional components, differently arranged functional components, or additional functional components than depicted in FIG. 8. Alternatively, or additionally, one or more functional components of hub device 110 may perform one or more other tasks described as being performed by one or more other functional components of hub device 110.

Figure 9:
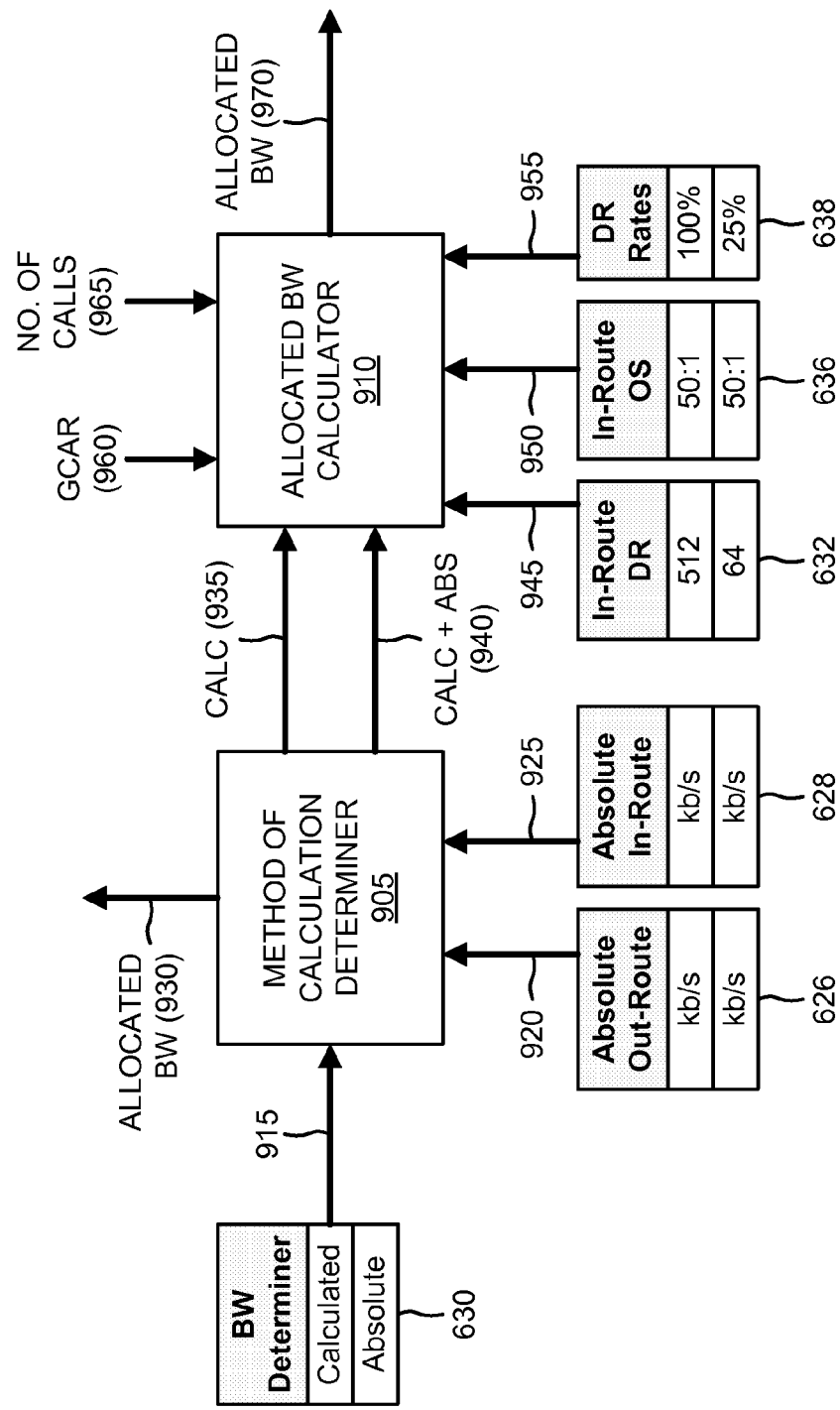
FIG. 9 is a diagram of example operations capable of being performed by still additional functional components of the hub device.

To determine an allocated bandwidth percentage, a bandwidth allocated to groups of VSATs 150 may be determined and divided by the total available bandwidth described above. The allocated bandwidth may be calculated as set forth in FIG. 9. FIG. 9 is a diagram of example operations 900 capable of being performed by still additional functional components of hub device 110. In one example, the operations described in connection with FIG. 9 may be performed by one or more components of device 200 (FIG. 2). As shown, hub device 110 may include a method of calculation determiner 905 and an allocated bandwidth calculator 910.

Method of calculation determiner 905 may receive information 915 from bandwidth determiner field 630, may receive information 920 from absolute out-route field 626, and may receive information 925 from absolute in-route field 628. Method of calculation determiner 905 may determine a method of calculating the allocated bandwidth based on information 915. Information 915 may indicate that one of an absolute method, a calculated method, or a calculated and absolute method is to be used to calculate the allocated bandwidth. If the absolute method is to be used, method of calculation determiner 905 may utilize information 920 (e.g., an amount of bandwidth assigned as a pool to a group in the out-route direction) from absolute out-route field 626 and information 925 (e.g., an amount of bandwidth assigned as a pool to a group in the in-route direction) from absolute in-route field 628 as an allocated bandwidth 930. If the calculated method is to be used, method of calculation determiner 905 may provide, to allocated bandwidth calculator 910, an indication 935 to use the calculated method. If the calculated and absolute method is to be used, method of calculation determiner 905 may provide, to allocated bandwidth calculator 910, an indication 940 to use the calculated and absolute method.

Allocated bandwidth calculator 910 may receive indication 935 or indication 940 from method of calculation determiner 905, may receive information 945 from in-route DR field 632, may receive information 950 from in-route OS field 636, and may receive information 955 from DR rates field 638. Information 945 may provide a peak or burstable data rate (DR) for a number (N) of VSATs 150 in a group. Information 950 may provide an oversubscription value (OS) for VSATs 150 in the group. Information 955 may provide DR rates (DRr) for VSATs 150 in the group.

Allocated bandwidth calculator 910 may receive an amount (GCAR) 960 of sustained bandwidth assigned to a VSAT in both the in-route and out-route directions, and may receive a number (V) 965 of calls associated with VSATs 150 in the group. Allocated bandwidth calculator 910 may multiply the number (N) of VSATs 150 in the group by the burstable data rate (DR) (e.g., the in-route bandwidth DR is used for in-route calculations and the out-route bandwidth DR is used for out-route calculations) and may divide the result by the oversubscription value (OS) (e.g., the in-route OS is used for in-route calculations and the out-route OS is used for out-route calculations). Allocated bandwidth calculator 910 may multiply the result by values from DR rates field 638 to obtain a first particular value. If a bandwidth type is standard, DR rates field 638 may be 100% since all of the bandwidth may be considered allocated. If a bandwidth type is DR, another field may be referenced to obtain the total allocated bandwidth for the group of VSATs 150. Allocated bandwidth calculator 910 may multiply number (V) 965 of calls by the bandwidth allocation per call (typically 32 kb/s, although this is not an absolute number), and may add the result to amount (GCAR) 960 of sustained bandwidth to obtain a second particular value. Allocated bandwidth calculator 910 may then add the first particular value and the second particular value to obtain an allocated bandwidth 970. Allocated bandwidth 970 may be calculated using the following equations:

$$VBW = V*32 \text{ kb/s} \quad (4),$$

$$TGCAR = GCAR + VBW \quad (5), \text{ and}$$

$$\text{Allocated Bandwidth} = (((N*DR)/OS)*DRr) + TGCAR \quad (6).$$

In one example, assume that N=50; DR=384; OS=50; DRr=100% (based on a standard bandwidth type); V=1; VBW=32 kb/s; and GCAR=16 kb/s. Utilizing equations (5) and (6), allocated bandwidth calculator 910 may calculate allocated bandwidth 970 as follows:

$$TGCAR = 32 + 16 = 48 \text{ kb/s, and}$$

$$\text{Allocated Bandwidth} = (((50*384)/50)*1) + 48 = 432 \text{ kb/s}.$$

If the same example is utilized, but DRr=10%, allocated bandwidth calculator 910 may calculate allocated bandwidth 970 as follows:

$$\text{Allocated Bandwidth} = (((50*384)/50)*0.1) + 48 = 86.4 \text{ kb/s}.$$

The equations may assume a 10% DR rate when a DR bandwidth is selected and there are more than ten (10) VSATs in a group. If there are less than ten (10) VSATs in the group, the equations may calculate the DR rate to a percentage that permits the allocated bandwidth to be equal to a bandwidth reserved for a single standard VSAT. However, some customers may want a DR percentage that is less than the standard 10% when there are a large number of VSATs involved. In such a situation, DR rates field 638 may use the DR percentage desired by the customer for the DR rate.

If allocated bandwidth calculator 910 receives indication 940 to use the calculated and absolute method, equation (6) may be modified to add an absolute bandwidth (ABS) from absolute out-route field 626 (e.g., for out-route calculations) or absolute in-route field 628 (e.g., for in-route calculations), as follows:

$$\text{Allocated Bandwidth} = (((N*DR)/OS)*DRr) + TGCAR + ABS \quad (6).$$

In one example, assume that N=50; DR=384; OS=50; DRr=100% (based on a standard bandwidth type); V=1; VBW=32 kb/s; GCAR=16 kb/s; and ABS=384 kb/s. Utilizing equation (5) and modified equation (6), allocated bandwidth calculator 910 may calculate allocated bandwidth 970 as follows:

$$TGCAR = 32 + 16 = 48 \text{ kb/s, and}$$

$$\text{Allocated Bandwidth} = (((50*384)/50)*1) + 48 + 384 = 816 \text{ kb/s}.$$

Once all of the bandwidth allocation numbers and management bandwidth numbers are calculated for group of VSATs 150, the numbers may totaled, the in-route totals may be copied to overview data component 400, and the out-route totals may be copied to out-route data component 420.

Although FIG. 9 shows example functional components of hub device 110, in other implementations, hub device 110 may include fewer functional components, different functional components, differently arranged functional components, or additional functional components than depicted in FIG. 9. Alternatively, or additionally, one or more functional components of hub device 110 may perform one or more other tasks described as being performed by one or more other functional components of hub device 110.

Returning to FIG. 4, out-route data component 420 may be used to calculate a total allocation of out-route carrier 160 with information obtained from each of in-route group components 410. FIG. 10 is a diagram of example information 1000 capable of being provided in out-route data component 420.

As shown in FIG. 10, out-route data component 420 may include a total out-route bandwidth field 1010 that includes a user-entered out-route bandwidth value (e.g., 18 Mb/s) for out-route carrier 160. The out-route bandwidth value may be converted to kb/s (e.g., 18,000 kb/s) in out-route in kb/s field 1020. Out-route data component 420 may include a section 1030 that provides out-route carrier 160 allocations used by each group of VSATs 150. The information provided in section 1030 may be copied from information calculated in-route group data components 410. An out-route used field 1040 may include a total of out-route carrier 160 that is used by all groups of VSATs 150.

As further shown in FIG. 10, out-route data component 420 may include an out-route overhead bandwidth field 1050 that includes an out-route overhead bandwidth (e.g., 512 kb/s). The out-route overhead bandwidth may include a user-entered value that is reserved for management traffic (e.g., polls for collecting statistics, time plan distribution, etc.) and is added to the total bandwidth allocations from the in-route groups. The values in out-route used field 1040 and out-route overhead bandwidth field 1050 may be added together, and the sum may be divided by the value in field 1020 to obtain a value provided in a percent of out-route used field 1060 (e.g., (17,277.38+512)/18,000=98.83%). A value provided in a percent out-route left field 1070 may be determined by subtracting the value (e.g., 98.83%) of percent of out-route used field 1060 from 100%. The values in out-route used field 1040 and percent of out-route used field 1060 may be copied to overview data component 400 (e.g., as shown in FIG. 5).

Although FIG. 10 shows example information 1000 of out-route data component 420, in other implementations, out-route data component 420 may include less information, different information, differently arranged information, or more information than depicted in FIG. 10.

Returning to FIG. 4, other data component 430 may include other information capable of being used by burstable/allocated bandwidth data structure 360. FIG. 11 is a diagram of example information 1100 capable of being provided in other data component 430.

As shown in FIG. 11, other data component 430 may include a carrier group field 1110, a bandwidth type field 1120, a customer identifier (ID) field 1130, a count field 1140, an out-route DR field 1150, and in-route DR field 1160. Carrier group field 1110 may identify an in-route group of VSATs 150. Bandwidth type field 1120 may define a bandwidth type for the in-route group in carrier group field 1110. Customer ID field 1130 may identify a customer associated with the in-route group in carrier group field 1110. Count field 1140 may identify a quantity of carriers for the in-route group in carrier group field 1110. Out-route DR field 1150 may include an amount of burstable bandwidth assigned to the in-route group in field 1110. In-route DR field 1260 may include an amount of burstable bandwidth assigned to the in-route group in field 1110.

Although FIG. 11 shows example information 1100 of other data component 430, in other implementations, other data component 430 may include less information, different information, differently arranged information, or more information than depicted in FIG. 11.

In one example implementation, burstable/allocated bandwidth data structure 360 may be used to manage bandwidth for VSAT network 100 by utilizing information, such as a base oversubscription number, a bandwidth per VSAT time, different types of bandwidth (e.g., absolute bandwidth, management bandwidth, etc.), and other information. Burstable/allocated bandwidth data structure 360 may track bandwidth allocation from a raw pool perspective, burstable bandwidth per carrier, and burstable/allocated bandwidth for VSATs with similar configurations. By managing bandwidth in this manner, burstable/allocated bandwidth data structure 360 may provide customers with optimal service by ensuring that, at any time, a carrier in network 100 may have bandwidth available for customer traffic that exceeds a minimum target burstable bandwidth rate.

When referencing burstable bandwidth herein, a percent of bandwidth may refer to bandwidth that is available as burstable bandwidth with respect to a target burstable bandwidth. For example, if a target burstable bandwidth is 512 kb/s and a percent of burstable bandwidth is 200%, then a maximum burstable bandwidth available may be 1024 kb/s. If the percent of burstable bandwidth is 50%, then the maximum burstable bandwidth may be 256 kb/s. When referencing bandwidth or allocated bandwidth herein, a percent of bandwidth used may be a total percent of an available bandwidth pool that is assigned to VSATs. For example, if there are five (5)

in-route carriers with 790 kb/s each of bandwidth, then the available bandwidth pool may be 5*790 or 3,950 kb/s. If 3540 kb/s of the pool is allocated, then 410 kb/s may remain and 89.6% of the available bandwidth pool may be assigned.

FIGS. 12-15 are flow charts of an example process 1200 for calculating and/or allocating burst rate and bandwidth in a VSAT network according to an implementation described herein. In one implementation, process 1200 may be performed by allocation component 115 of hub device 110. In another implementation, some or all of process 1200 may be performed by another device or group of devices, including or excluding hub device 110.

Figure 12:
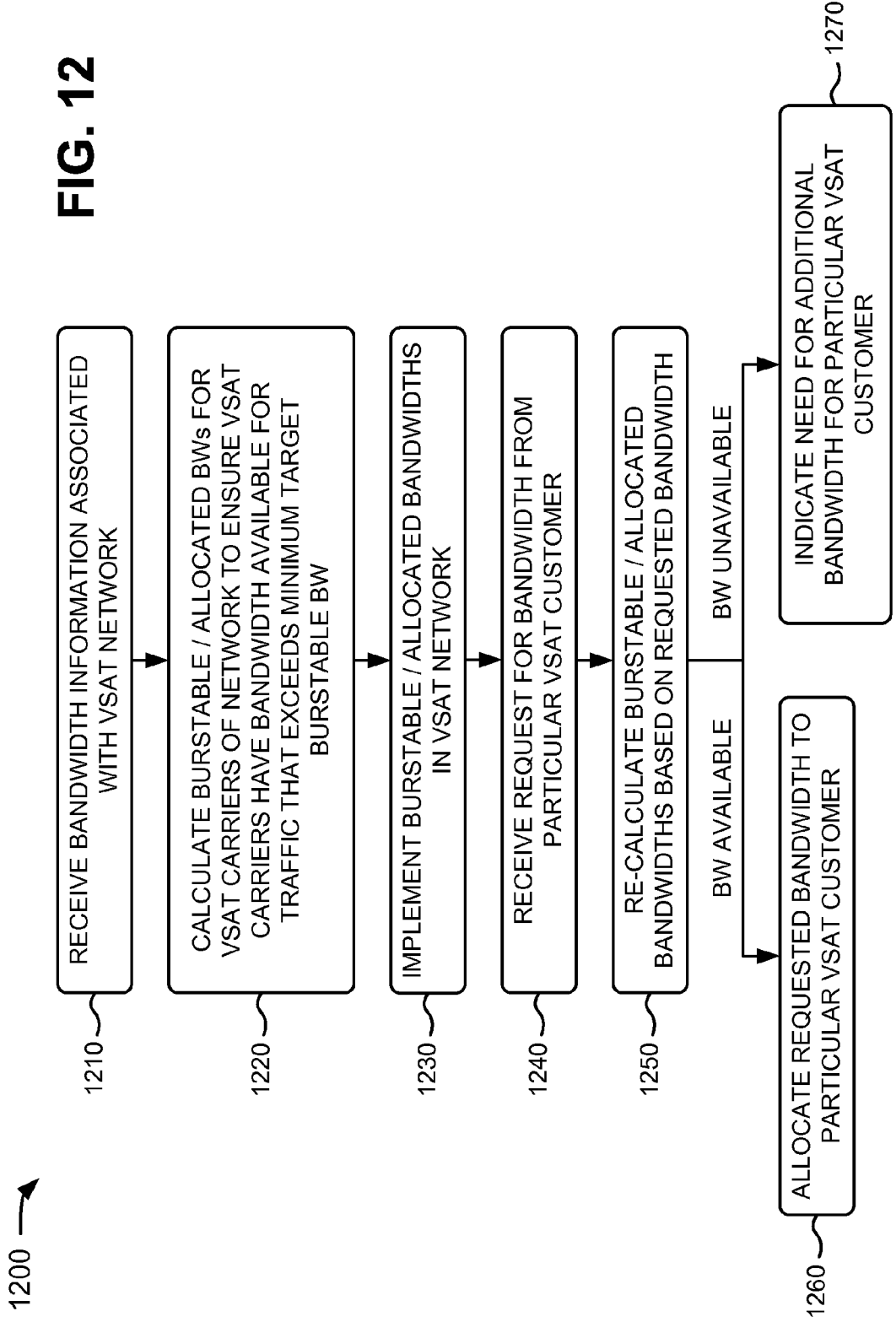
FIGS. 12-15 are flow charts of an example process for calculating and/or allocating burst rate and bandwidth in a VSAT network according to an implementation described herein.

As shown in FIG. 12, process 1200 may include receiving bandwidth information associated with a VSAT network (block 1210). For example, in an implementation described above in connection with FIG. 3, allocation component 115 of hub device 110 may receive allocated bandwidth (BW) information 310, burstable bandwidth information 330, bandwidth reservation pool information 340, and other information 350. Allocated bandwidth information 310 may include an amount of bandwidth that is assigned to actual or planned VSATs 150 in VSAT network 100. Burstable bandwidth information 330 may include a maximum bandwidth that is available to be granted to a VSAT 150 for a short period of time. Burstable bandwidth information 330 may include a target burstable bandwidth and a minimum burstable bandwidth. A target burstable bandwidth may include a desired burstable bandwidth rate to be maintained in an in-route carrier 180 or an in-route carrier group. A minimum burstable bandwidth may include a minimum acceptable burstable bandwidth maintained by an in-route carrier 180 or an in-route carrier group. Bandwidth pool reservation information 340 may include an available bandwidth pool that is assigned to VSATs 150. Other information 350 may include other information associated with operation of VSAT network 100, such as: a time slot per carrier; IP throughput per carrier; a quantity of carriers; a bandwidth per time slot; a bandwidth used for managing VSATs 150; a quantity of VSATs 150; a bandwidth type; a number of bursts per time slot; a burstable data rate; an oversubscription value; disaster recovery rates; etc.

As further shown in FIG. 12, process 1200 may include calculating burstable and allocated bandwidths for VSAT carriers of the VSAT network to ensure that the VSAT carriers have bandwidth available for traffic that exceeds a minimum target burstable bandwidth (block 1220). For example, in an implementation described above in connection with FIG. 3, allocation component 115 may calculate, based on information 310-350, burstable and/or allocated bandwidths for VSATs 150 to ensure that VSATs 150 have bandwidth available for traffic that exceeds a minimum target burstable bandwidth. Allocation component 115 may calculate burstable and/or allocated bandwidths for VSATs 150 via a burstable/allocated bandwidth data structure 360. Burstable/allocated bandwidth data structure 360 may include, for example, one or more tables, one or more databases, one or more or spreadsheets, one or more trees, or some other arrangement for storing and organizing information associated with VSAT network 100.

Returning to FIG. 12, process 1200 may include implementing the burstable and allocated bandwidths in the VSAT network (block 1230). For example, allocation component 115 of hub device 110 may implement the burstable and/or allocated bandwidths for out-route 160, in-route carriers 180, and VSATs 150 associated with VSAT network 100.

As further shown in FIG. 12, process 1200 may include receiving a request for bandwidth from a particular VSAT customer (block 1240), and recalculating the burstable and allocated bandwidths based on the requested bandwidth (block 1250). For example, in an implementation described above in connection with FIG. 3, allocation component 115 may receive order 370 for bandwidth from a particular VSAT customer (e.g., from a customer that operates one or more VSATs 150). Based on the requested bandwidth of customer order 370, allocation component 115 may re-calculate the burstable and/or allocated bandwidths for VSAT network 100. In one example, allocation component 115 may re-calculate burstable/allocated bandwidth data structure 360 based on customer order 370.

Returning to FIG. 12, if the re-calculation indicates that bandwidth is available (block 1250—BW AVAILABLE), process 1200 may include allocating the requested bandwidth to the particular VSAT customer (block 1260). If the re-calculation indicates that bandwidth is unavailable (block 1250—BW UNAVAILABLE), process 1200 may include indicating a need for additional bandwidth for the particular VSAT customer (block 1270). For example, in an implementation described above in connection with FIG. 3, if the re-calculation indicates that the requested bandwidth is available in VSAT network 100, allocation component 115 may allocate the requested bandwidth to the particular VSAT customer, as indicated by reference number 380. If the re-calculation indicates that the requested bandwidth is unavailable, allocation component 115 may indicate a need for additional bandwidth for the particular VSAT customer, as indicated by reference number 390. In order to provide the additional bandwidth, hub device 110 may be provided with hardware that provides the additional bandwidth, another hub device 110 may added to VSAT network 100, etc.

Figure 13:
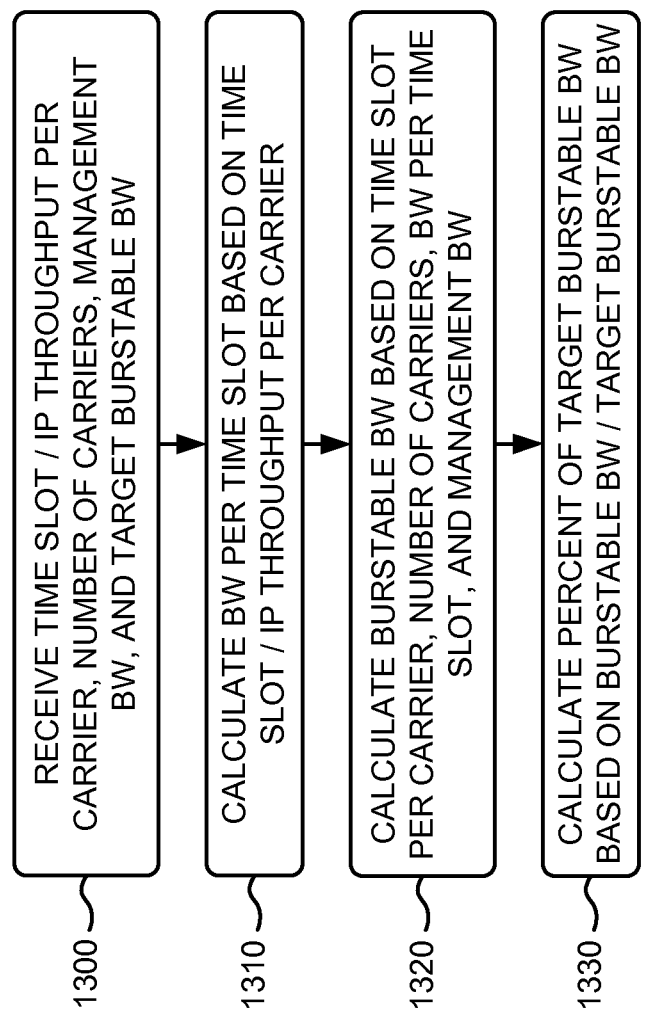

Process block 1220 may include the process blocks depicted in FIG. 13. As shown in FIG. 13, process block 1220 may include receiving a time slot, an IP throughput per carrier, a number of carriers, a management bandwidth, and a target burstable bandwidth (block 1300), and calculating a bandwidth per time slot based on the time slot and the IP throughput per carrier (block 1310). For example, in an implementation described above in connection with FIG. 7, hub device 110 may include burstable bandwidth calculator 705 that receives information 710 from in-route group data component 410. In one example, information 710 may include time slots per carrier (TsC) field 715, carrier IP throughput (IP) field 720, number of carriers (C) field 725, target burstable bandwidth (TBBw) field 730, and bandwidth per time slot (BTs) field 735, which equals the carrier IP throughput divided by the time slots per carrier (IP/TsC). Burstable bandwidth calculator 705 may also receive a bandwidth used for managing remotes (MBw) 740.

As further shown in FIG. 13, process block 1220 may include calculating a burstable bandwidth based on the time slot per carrier, the number of carriers, the bandwidth per time slot, and the management bandwidth (block 1320), and calculating a percent of target burstable bandwidth based on the burstable bandwidth and the target burstable bandwidth (block 1330). For example, in an implementation described above in connection with FIG. 7, burstable bandwidth calculator 705 may calculate available burstable bandwidth 745 and percent of target burstable bandwidth 750 based on information 710 and bandwidth used for managing remotes (MBw) 740. In one example, burstable bandwidth calculator 705 may calculate available burstable bandwidth 745 and percent of target burstable bandwidth 750 according to the following equations:

$$\text{Burstable Bandwidth} = (((TsC*C)*BTs) - ((MBw*BTs)))/C \qquad (1),$$

% of Target Burstable Bandwidth=Burstable Bandwidth/*TBBw* (2).

Figure 14:
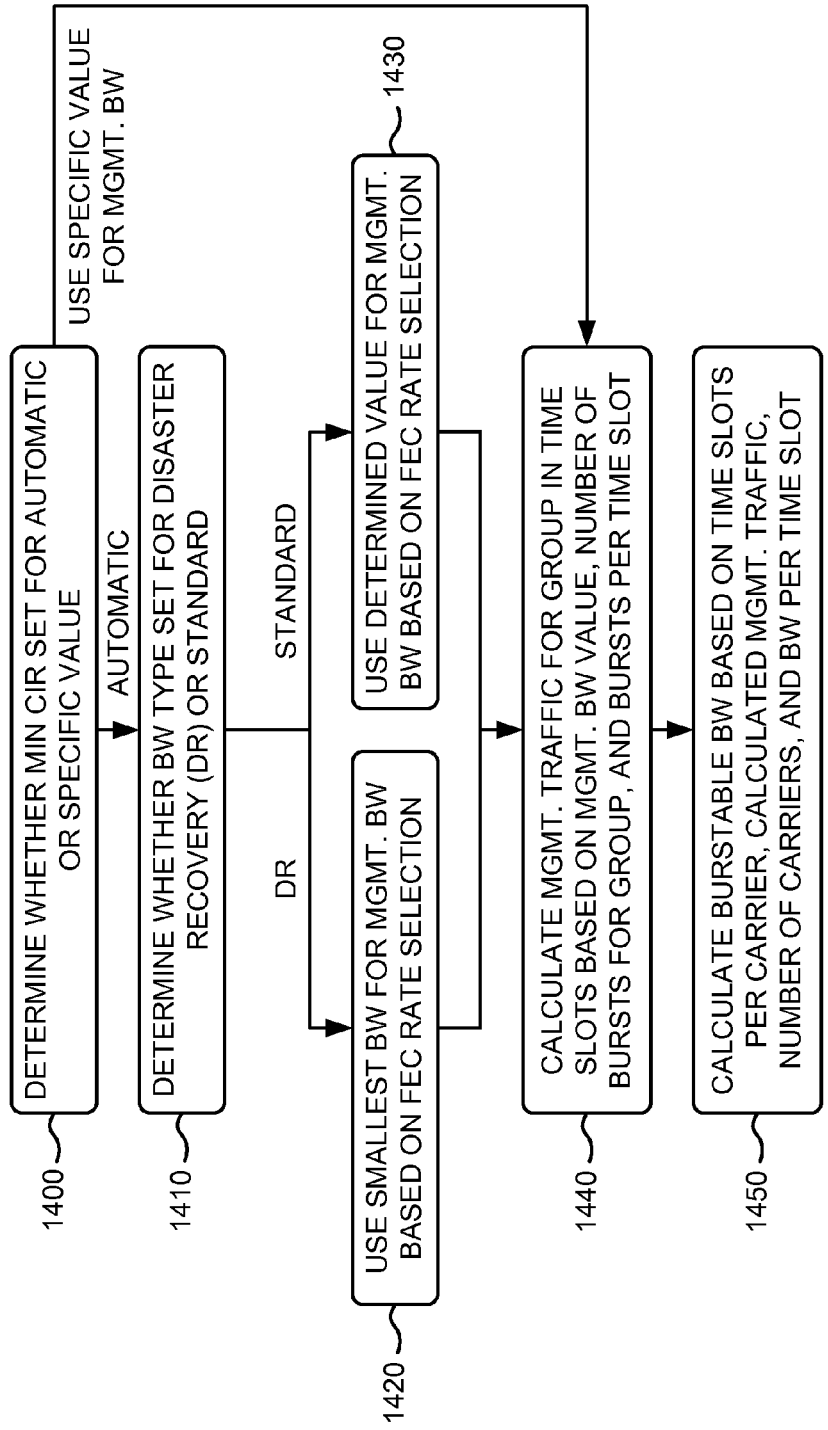

Alternatively, or additionally, process block 1220 may include the process blocks depicted in FIG. 14. As shown in FIG. 14, process block 1220 may include determining whether a minimum CIR is set for automatic or a specific value (block 1400). If the minimum CIR is set for the specific value (block 1400—USE SPECIFIC VALUE FOR MGMT. BW), process block 1220 may include using the specific value for a management bandwidth and proceeding to process block 1440. For example, in an implementation described above in connection with FIG. 8, minimum CIR determiner 805 may receive information 820 from minimum CIR field 634 and information 825 from minimum CIR table 650. Minimum CIR determiner 805 may determine, based on information 820 and/or information 825, whether minimum CIR field 634 is set for automatic or specific value. If minimum CIR field 634 is set for specific value 830, minimum CIR determiner 805 may provide specific value 830 to management traffic calculator 815 and specific value 830 may be used for each VSAT's 150 management bandwidth.

As further shown in FIG. 14, if the minimum CIR is set for automatic (block 1400—AUTOMATIC), process block 1220 may include determining whether a bandwidth type is set for disaster recovery (DR) or standard (block 1410). If the bandwidth type is set for DR (block 1410—DR), process block 1220 may include using a smallest bandwidth for a management bandwidth based on a FEC rate selection (block 1420). If the bandwidth type is set for standard (block 1410—STANDARD), process block 1220 may include using a determined value for the management bandwidth based on the FEC rate selection (block 1430). For example, in an implementation described above in connection with FIG. 8, if minimum CIR field 634 is set for automatic, minimum CIR determiner 805 may provide, to bandwidth type determiner 810, indication 835 that minimum CIR field 634 is set for automatic. Bandwidth type determiner 810 may receive indication 835, and may retrieve, based on indication 835, information 840 from bandwidth type field 624 and information 845 from FEC selection table 660. Bandwidth type determiner 810 may determine, based on information 840, whether bandwidth type field 624 is set to a bandwidth type of DR or standard. If bandwidth type field 624 is set to a bandwidth type of DR, bandwidth type determiner 810 may use smallest bandwidth 850 for the management bandwidth based on a FEC rate selection for each VSAT 150 (e.g., as provided in information 845). If bandwidth type field 624 is set to a bandwidth type of standard, bandwidth type determiner 810 may use determined bandwidth 855 for the management bandwidth based on the FEC rate selection.

Returning to FIG. 14, process block 1220 may include calculating management traffic for a group in time slots based on the management bandwidth value, a number of bursts for the group, and bursts per time slot (block 1440). For example, in an implementation described above in connection with FIG. 8, management traffic calculator 815 may receive, as the management bandwidth, specific value 830 from minimum CIR determiner 805. Alternatively, management traffic calculator 815 may receive, as the management bandwidth, smallest bandwidth 850 or determined bandwidth 855 from bandwidth type determiner 810. Based on the received management bandwidth, management traffic calculator 815 may calculate management traffic for a group of VSATs 150 in time slots. Management traffic calculator 815 may accomplish this by comparing the management bandwidth (MB) to a look up table and retrieving a number of bursts from the table. Management traffic calculator 815 may multiply the number of bursts by a number (N) of VSATs 150 in a group and may divide the result by a number (Bursts) of bursts per time slot, as set forth in the following equation:

$(MB*N)/\text{Bursts}$ (3).

As further shown in FIG. 14, process block 1220 may include calculating the burstable bandwidth based on the time slots per carrier, the calculated management traffic, the number of carriers, and the bandwidth per time slot (block 1450). For example, in an implementation described above in connection with FIG. 8, management traffic calculator 815 may utilize equation (1) (e.g., Burstable Bandwidth=(((TsC*C)*BTs)−((MBw*BTs))/C) to determine burstable bandwidth 860 per VSAT. Management traffic calculator 815 may output burstable bandwidth 860 to of in-route group data component 410.

Figure 15:
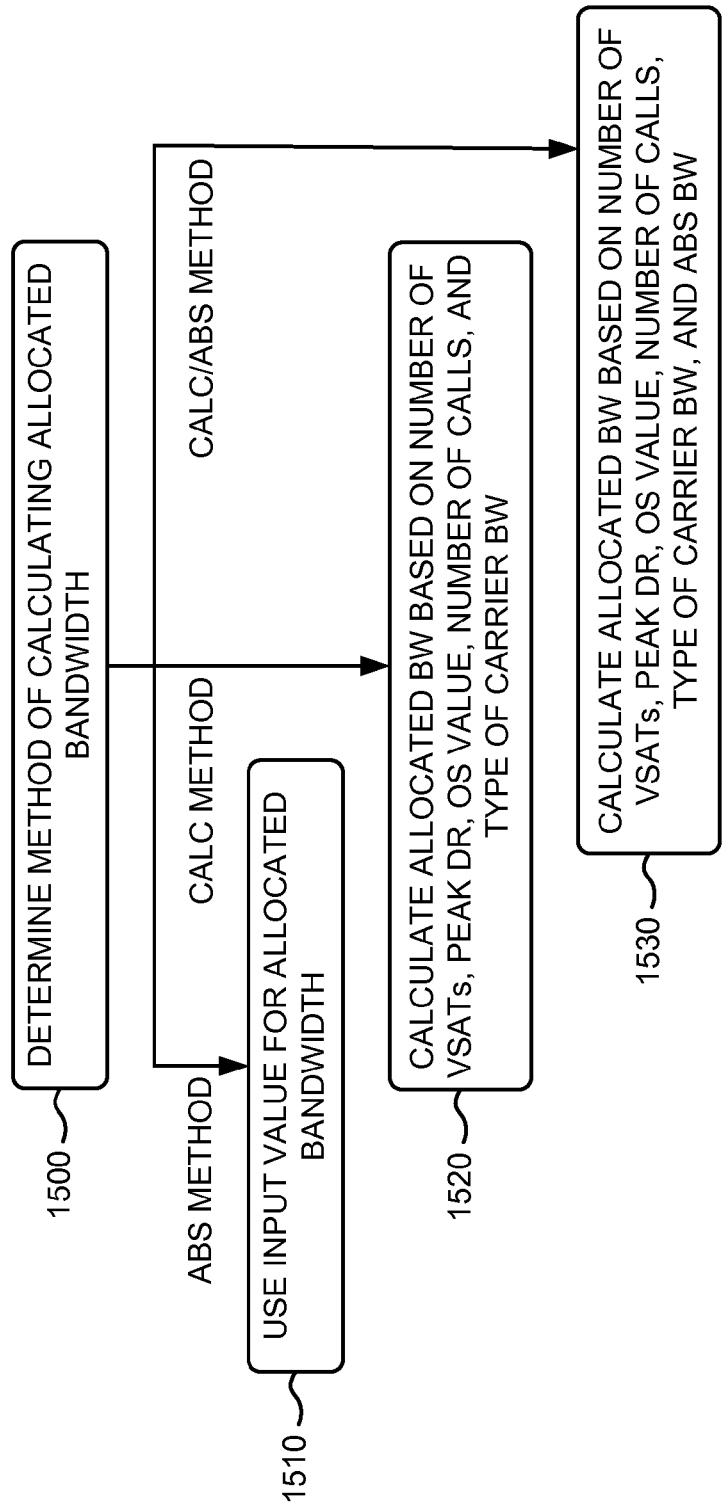

Alternatively, or additionally, process block 1220 may include the process blocks depicted in FIG. 15. As shown in FIG. 15, process block 1220 may include determining a method of calculating the allocated bandwidth (block 1500). If the method of calculating is an absolute method (block 1500—ABS METHOD), process block 1220 may include using an input value for the allocated bandwidth (block 1510). For example, in an implementation described above in connection with FIG. 9, method of calculation determiner 905 may receive information 915 from bandwidth determiner field 630, may receive information 920 from absolute out-route field 626, and may receive information 925 from absolute in-route field 628. Method of calculation determiner 905 may determine a method of calculating the allocated bandwidth based on information 915. Information 915 may indicate that one of an absolute method, a calculated method, or a calculated and absolute method is to be used to calculate the allocated bandwidth. If the absolute method is to be used, method of calculation determiner 905 may utilize information 920 (e.g., an amount of bandwidth assigned as a pool to a group in the out-route direction) from absolute out-route field 626 and information 925 (e.g., an amount of bandwidth assigned as a pool to a group in the in-route direction) from absolute in-route field 628 as allocated bandwidth 930.

As further shown in FIG. 15, if the method of calculating is a calculated method (block 1500—CALC METHOD), process block 1220 may include calculating the allocated bandwidth based on a number of VSATs, a peak data rate (DR), an OS value, a number of calls, and a type of carrier bandwidth (block 1520). For example, in an implementation described above in connection with FIG. 9, if the calculated method is to be used, method of calculation determiner 905 may provide, to allocated bandwidth calculator 910, indication 935 to use the calculated method. If the calculated and absolute method is to be used, method of calculation determiner 905 may provide, to allocated bandwidth calculator 910, indication 940 to use the calculated and absolute method. Allocated bandwidth calculator 910 may receive indication 935 or indication 940 from method of calculation determiner 905, may receive information 945 from in-route DR field 632, may receive information 950 from in-route OS field 636, and may receive information 955 from DR rates field 638. Information 945 may provide a peak or burstable data rate (DR) for a number (N) of VSATs 150 in a group. Information 950 may provide an oversubscription value (OS) for VSATs 150 in the group. Information 955 may provide DR rates (DRr) for VSATs 150 in the group.

Allocated bandwidth calculator 910 may receive amount (GCAR) 960 of sustained bandwidth assigned to a VSAT in both the in-route and out-route directions, and may receive a number (V) 965 of calls associated with VSATs 150 in the group. Allocated bandwidth calculator 910 may multiply the number (N) of VSATs 150 in the group by the burstable data rate (DR) and may divide the result by the oversubscription value (OS). Allocated bandwidth calculator 910 may multiply the result by values from DR rates field 638 to obtain a first particular value. If a bandwidth type is standard, DR rates field 638 may be 100% since all of the bandwidth may be considered allocated. If a bandwidth type is DR, another field may be referenced to obtain the total allocated bandwidth for the group of VSATs 150. Allocated bandwidth calculator 910 may multiply number (V) 965 of calls by the bandwidth allocation per call (typically 32 kb/s, although this is not an absolute number), and may add the result to amount (GCAR) 960 of sustained bandwidth to obtain a second particular value. Allocated bandwidth calculator 910 may then add the first particular value and the second particular value to obtain an allocated bandwidth 970. Allocated bandwidth 970 may be calculated using the following equations:

$$VBW = V*32 \text{ kb/s} \quad (4),$$

$$TGCAR = GCAR + VBW \quad (5), \text{ and}$$

$$\text{Allocated Bandwidth} = (((N*DR)/OS)*DRr) + TGCAR \quad (6).$$

As further shown in FIG. 15, if the method of calculating is a calculated/absolute method (block 1500—CALC/ABS METHOD), process block 1220 may include calculating the allocated bandwidth based on the number of VSATs, the peak DR, the OS value, the number of calls, the type of carrier bandwidth, and an absolute bandwidth (block 1530). For example, in an implementation described above in connection with FIG. 9, if allocated bandwidth calculator 910 receives indication 940 to use the calculated and absolute method, equation (6) may be modified to add an absolute bandwidth (ABS) from absolute out-route field 626 (e.g., for out-route calculations) or absolute in-route field 628 (e.g., for in-route calculations), as follows:

$$\text{Allocated Bandwidth} = (((N*DR)/OS)*DRr) + TGCAR + ABS \quad (6).$$

Systems and/or methods described herein may provide a mechanism to calculate and/or allocate burst rate and bandwidths in a network, such as a VSAT network.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 13-16, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving, by a computing device, bandwidth information associated with a very small aperture terminal (VSAT) network;
calculating, by the computing device, burstable and allocated bandwidths for VSAT carriers of the VSAT network to ensure that the VSAT carriers have bandwidth available for traffic that exceeds a minimum target burstable bandwidth,
calculating the burstable and allocated bandwidths including one or more of:
using an input value for an allocated bandwidth of the burstable and allocated bandwidths,
calculating the allocated bandwidth based on a quantity of VSATs, a peak data rate, an oversubscription (OS) value, a quantity of calls, and a type of carrier bandwidth, or
calculating the allocated bandwidth based on the quantity of VSATs, the peak data rate, the OS value, the quantity of calls, the type of carrier bandwidth, and an absolute bandwidth; and
implementing, by the computing device, the burstable and allocated bandwidths in the VSAT network.

2. The method of claim 1, further comprising:
receiving a request for bandwidth from a particular VSAT customer;
re-calculating the burstable and allocated bandwidths based on the requested bandwidth;
allocating the requested bandwidth to the particular VSAT customer when the re-calculation indicates that the requested bandwidth is available in the VSAT network; and
indicating a need for additional bandwidth for the particular VSAT customer when the re-calculation indicates that the requested bandwidth is unavailable in the VSAT network.

3. The method of claim 1, where calculating the burstable and allocated bandwidths further comprises:
receiving a time slot per VSAT carrier, an Internet protocol (IP) throughput per VSAT carrier, a number of VSAT carriers, and a management bandwidth;
calculating a bandwidth per time slot based on the time slot and the IP throughput per VSAT carrier; and
calculating a burstable bandwidth, of the burstable and allocated bandwidths, based on the time slot per VSAT carrier, the number of VSAT carriers, the bandwidth per time slot, and the management bandwidth.

4. The method of claim 3, where calculating the burstable and allocated bandwidths further comprises:
receiving a target burstable bandwidth; and
calculating a percent of target burstable bandwidth based on the burstable bandwidth and the target burstable bandwidth.

5. The method of claim 1, where calculating the burstable and allocated bandwidths further comprises:

determining whether a minimum committed information rate (CIR) is set for automatic or a specific value; and using the specific value for a management bandwidth when the minimum CIR is set for the specific value.

6. The method of claim 5, where calculating the burstable and allocated bandwidths further comprises:

determining whether a bandwidth type is set for disaster recovery (DR) or standard when the minimum CIR is set for automatic;

using, based on a forward error correction (FEC) rate selection, a smallest bandwidth for the management bandwidth when the bandwidth type is set for DR; and using, based on the FEC rate selection, a determined value for the management bandwidth when the bandwidth type is set for standard.

7. The method of claim 6, where calculating the burstable and allocated bandwidths further comprises:

calculating management traffic for a group of VSATs, in time slots, based on the management bandwidth, a quantity of bursts for the group, and bursts per time slot; and calculating the burstable bandwidth based on the time slots per VSAT carrier, the calculated management traffic, the quantity of VSAT carriers, and the bandwidth per time slot.

8. The method of claim 1, where implementing the burstable and allocated bandwidths includes:

allocating bandwidth to an out-route carrier signal, and allocating bandwidth to an in-route carrier signal.

9. A device, comprising:

a processor to:

receive bandwidth information associated with a very small aperture terminal (VSAT) network, calculate burstable and allocated bandwidths for VSAT carriers of the VSAT network to ensure that the VSAT carriers have bandwidth available for traffic that exceeds a minimum target burstable bandwidth, when calculating the burstable and allocated bandwidths for the VSAT carriers, the processor being to:

determine whether a minimum committed information rate (CIR) is set for automatic or a specific value, utilize the specific value for a management bandwidth when the minimum CIR is set for the specific value, determine whether a bandwidth type is set for disaster recovery (DR) or standard when the minimum CIR is set for automatic, utilize, based on a forward error correction (FEC) rate selection, a smallest bandwidth for the management bandwidth when the bandwidth type is set for DR, and utilize, based on the FEC rate selection, a determined value for the management bandwidth when the bandwidth type is set for standard, and implement the burstable and allocated bandwidths in the VSAT network.

10. The device of claim 9, where the processor is further to:

receive a request for bandwidth from a particular VSAT customer, re-calculate the burstable and allocated bandwidths based on the requested bandwidth, allocate the requested bandwidth to the particular VSAT customer when the re-calculation indicates that the requested bandwidth is available in the VSAT network, and provide an indication for additional bandwidth for the particular VSAT customer when the re-calculation indicates that the requested bandwidth is unavailable in the VSAT network.

11. The device of claim 9, where, when calculating the burstable and allocated bandwidths, the processor is further to:

receive a time slot per VSAT carrier, an Internet protocol (IP) throughput per VSAT carrier, a quantity of VSAT carriers, and a management bandwidth, calculate a bandwidth per time slot based on the time slot and the IP throughput per VSAT carrier, and calculate a burstable bandwidth, of the burstable and allocated bandwidths, based on the time slot per VSAT carrier, the quantity of VSAT carriers, the bandwidth per time slot, and the management bandwidth.

12. The device of claim 11, where, when calculating the burstable and allocated bandwidths, the processor is further to:

receive a target burstable bandwidth, and calculate a percent of target burstable bandwidth based on the burstable bandwidth and the target burstable bandwidth.

13. The device of claim 9, where, when calculating the burstable and allocated bandwidths, the processor is further to:

calculate management traffic for a group of VSATs, in time slots, based on the management bandwidth, a quantity of bursts for the group, and bursts per time slot, and calculate a burstable bandwidth, of the burstable and allocated bandwidths, based on the time slots per VSAT carrier, the calculated management traffic, the quantity of VSAT carriers, and the bandwidth per time slot.

14. The device of claim 9, where, when calculating the burstable and allocated bandwidths, the processor is further to:

determine whether a method of calculating an allocated bandwidth, of the burstable and allocated bandwidths, is an absolute method, a calculated method, or a calculated and absolute method, utilize an input value for the allocated bandwidth when the method of calculating the allocated bandwidth is the absolute method, calculate, when the method of calculating the allocated bandwidth is the calculated method, the allocated bandwidth based on a quantity of VSATs, a peak data rate, an oversubscription (OS) value, a quantity of calls, and a type of carrier bandwidth, and calculate, when the method of calculating the allocated bandwidth is the calculated and absolute method, the allocated bandwidth based on the quantity of VSATs, the peak data rate, the OS value, the quantity of calls, the type of carrier bandwidth, and an absolute bandwidth.

15. The device of claim 9, where the device comprises a satellite hub device.

16. The device of claim 9, where the processor is further to:

provide a connection between the VSATs and a private Internet Protocol (IP) network based on implementing the burstable and allocated bandwidths.

17. One or more non-transitory computer-readable media storing instructions, the instructions comprising:

one or more instructions that, when executed by one or more processors of a device, cause the one or more processors to:

receive bandwidth information associated with a very small aperture terminal (VSAT) network;

calculate burstable and allocated bandwidths for VSAT carriers of the VSAT network to ensure that the VSAT carriers have bandwidth available for traffic that exceeds a minimum target burstable bandwidth,
  where the one or more instructions to calculate the burstable and allocated bandwidths include one or more of:
    one or more instructions to use an input value for an allocated bandwidth of the burstable and allocated bandwidths,
    one or more instructions to calculate the allocated bandwidth based on a quantity of VSATs, a peak data rate, an oversubscription (OS) value, a quantity of calls, and a type of carrier bandwidth, or
    one or more instructions to calculate the allocated bandwidth based on the quantity of VSATs, the peak data rate, the OS value, the quantity of calls, the type of carrier bandwidth, and an absolute bandwidth, and
  one or more instructions to implement the burstable and allocated bandwidths in the VSAT network.

18. The one or more non-transitory computer-readable media of claim 17, where the instructions further comprise:
  one or more instructions to receive a request for bandwidth from a particular VSAT customer;
  one or more instructions to re-calculate the burstable and allocated bandwidths based on the requested bandwidth;
  one or more instructions to allocate the requested bandwidth to the particular VSAT customer when the re-calculation indicates that the requested bandwidth is available in the VSAT network; and
  one or more instructions to provide an indication for additional bandwidth for the particular VSAT customer when the re-calculation indicates that the requested bandwidth is unavailable in the VSAT network.

19. The one or more non-transitory computer-readable media of claim 17, where the instructions further comprise:
  one or more instructions to receive a time slot per VSAT carrier, an Internet protocol (IP) throughput per VSAT carrier, a quantity of VSAT carriers, a management bandwidth, and a target burstable bandwidth;
  one or more instructions to calculate a bandwidth per time slot based on the time slot and the IP throughput per VSAT carrier; and
  one or more instructions to calculate a burstable bandwidth, of the burstable and allocated bandwidths, based on the time slot per VSAT carrier, the quantity of VSAT carriers, the bandwidth per time slot, and the management bandwidth.

20. The one or more non-transitory computer-readable media of claim 19, where the instructions further comprise:
  one or more instructions to calculate a percent of target burstable bandwidth based on the burstable bandwidth and the target burstable bandwidth.

21. The one or more non-transitory computer-readable media of claim 17, where the instructions further comprise:
  one or more instructions to determine whether a minimum committed information rate (CIR) is set for automatic or a specific value; and
  one or more instructions to utilize the specific value for a management bandwidth when the minimum CIR is set for the specific value.

22. The one or more non-transitory computer-readable media of claim 21, where the instructions further comprise:
  one or more instructions to determine whether a bandwidth type is set for disaster recovery (DR) or standard when the minimum CIR is set for automatic;
  one or more instructions to utilize, based on a forward error correction (FEC) rate selection, a smallest bandwidth for the management bandwidth when the bandwidth type is set for DR; and
  one or more instructions to utilize, based on the FEC rate selection, a determined value for the management bandwidth when the bandwidth type is set for standard.

23. The one or more non-transitory computer-readable media of claim 22, where the instructions further comprise:
  one or more instructions to calculate management traffic for a group of VSATs, in time slots, based on the management bandwidth, a number of bursts for the group, and bursts per time slot; and
  one or more instructions to calculate a burstable bandwidth, of the burstable and allocated bandwidths, based on the time slots per VSAT carrier, the calculated management traffic, the number of VSAT carriers, and the bandwidth per time slot.

24. The one or more non-transitory computer-readable media of claim 17, where the instructions further comprise:
  one or more instructions to provide an out-route carrier signal that is received at the VSATs based on implementing the burstable and allocated bandwidths.

25. A device comprising:
  a processor to:
    receive bandwidth information associated with a very small aperture terminal (VSAT) network;
    calculate burstable and allocated bandwidths for VSAT carriers of the VSAT network to ensure that the VSAT carriers have bandwidth available for traffic that exceeds a minimum target burstable bandwidth,
      when calculating the burstable and allocated bandwidths, the processor being to:
        determine whether a minimum committed information rate (CIR) is set for automatic or a specific value,
        use the specific value for a management bandwidth when the minimum CIR is set for the specific value,
        determine whether a bandwidth type is set for disaster recovery (DR) or standard when the minimum CIR is set for automatic,
        use, based on a forward error correction (FEC) rate selection, a smallest bandwidth for the management bandwidth when the bandwidth type is set for DR, and
        use, based on the FEC rate selection, a determined value for the management bandwidth when the bandwidth type is set for standard; and
    implement the burstable and allocated bandwidths in the VSAT network.

* * * * *